April 30, 1940.　　　　V. D. POPOV　　　　2,198,788

AUTOMATIC WEIGHING APPARATUS

Filed Aug. 29, 1934　　　2 Sheets-Sheet 1

Vladimir Dmitrijevic Popov
INVENTOR

By [signature]
his ATTY.

April 30, 1940.  V. D. POPOV  2,198,788
AUTOMATIC WEIGHING APPARATUS
Filed Aug. 29, 1934   2 Sheets-Sheet 2
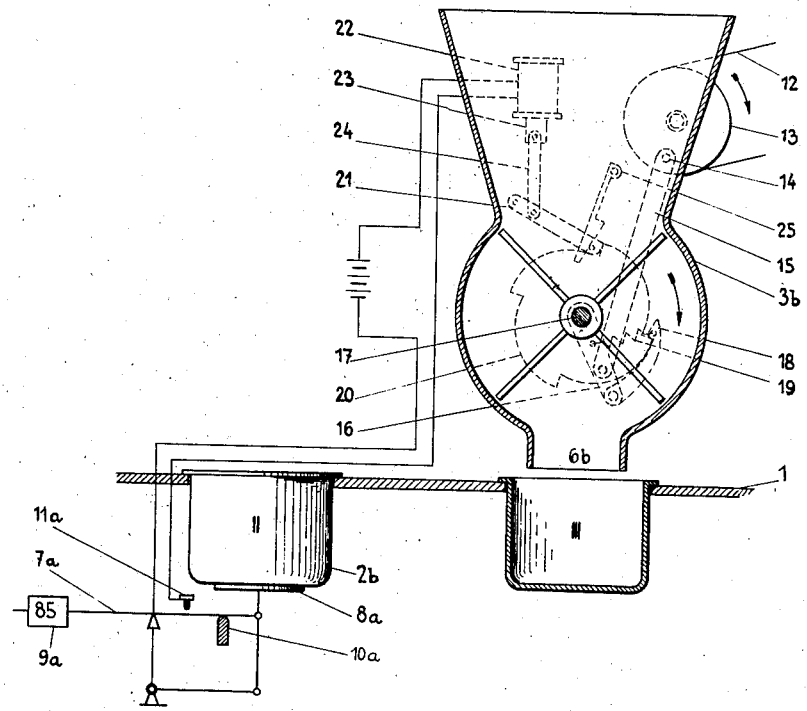
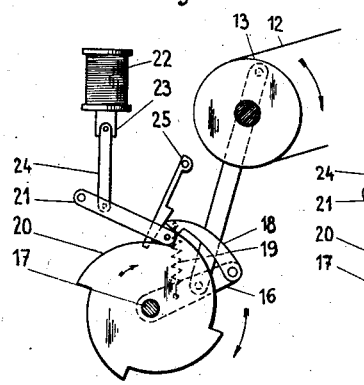
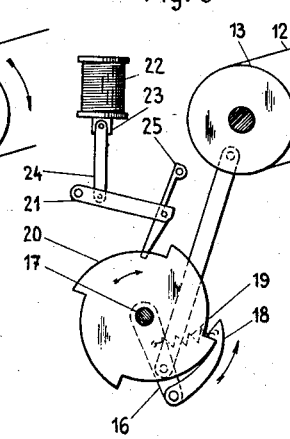
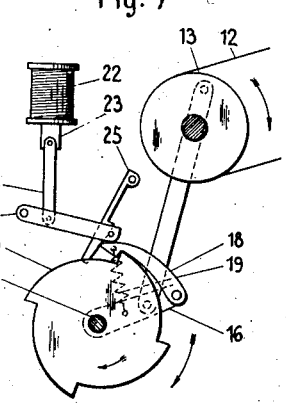
Vladimir Dmitrijevic Popov
INVENTOR Patented Apr. 30, 1940

2,198,788

UNITED STATES PATENT OFFICE 2,198,788

AUTOMATIC WEIGHING APPARATUS

Vladimir Dmitrijevic Popov, Prague-Bubenec, Czechoslovakia

Application August 29, 1934, Serial No. 741,885
In Czechoslovakia October 19, 1933

3 Claims. (Cl. 249—15)

Known systems of automatic scales depend upon the charging of material into scale-pans or the like by means of an uninterrupted or interrupted stream having a relatively high intensity at the beginning of the weighing and an intensity which decreases continuously at the end of the weighing, with the object of thereby obtaining the determined degree of accuracy of weighing. Any desired degree of accuracy of weighing can in fact be obtained with such a method of weighing; but other demands besides accuracy are made on modern automatic scales, namely that they shall have an output which corresponds, for example, to the output of a packing machine with which they are as a rule associated, where for example, tea, tobacco and the like are being packed. A further important requirement is that the scales should operate cyclically, that is, that they should work in unison with the packing machines.

Increasing the output of automatic scales which are based on the principle set forth is only possible at the expense of the accuracy of weighing, but the attainment of a cyclical instead of a non-cyclical operation is impossible since, owing to the non-uniformity of the structure of the material the delivery means cannot supply the accurately determined weight of material in an accurately determined time interval. If it were possible to obtain in such a way a particular weight of material in a determined interval of time, it would be unnecessary to carry out batch weighing; merely a periodical interruption of the flow of material at accurately timed intervals would suffice to yield by a mechanical process a division of the material into packets of equal weight. Batch weighing at determined intervals can only be effected by semi-automatic devices which operate only partly mechanically. As an example may be cited a device comprising a round table, round which are disposed a number of attendants and on which scales move continuously and uniformly, the scales being provided with pans for the material. Each empty scale-pan passes in front of the first attendant who has to charge it manually with such a quantity of material that the scale is approximately in equilibrium. In the second movement the scale, with the pan and the material, comes to the second attendant, who has to determine whether the scale is in equilibrium. If the first attendant has supplied, for example, too much material, since equilibrium has not occurred, the second attendant reduces the error of the first by removing material. The remaining attendant reduces the error of the second by adding material to or taking material out of the scale-pan, until the scale comes to the last attendant who corrects the error in weight of the batch. The scale-pan which is filled with the determined quantity of material, then advances to an attendant who takes the prepared batches and feeds the packing machine.

An object of the present invention is to provide a new apparatus for automatic batch weighing which is based on the combination of the mechanical measuring of the batches of material and automatic weighting. The apparatus according to the present invention is of such a character that not only does it guarantee the accuracy of the weighing within desired limits, as is similarly the case with the previously known devices for batch weighing, but also, as distinct from these constructions, is the possibility afforded not only of increasing the rate of batch weighing, but also of making feasible the absolutely cyclic operation of automatic scales. According to the present invention, neither the output nor the frequency of operation depends on the structure of the material. This result is obtained by feeding the material into the scale-pan as require invariably at an accurately determined time interval which is independent of the weight of material that is actually in the pan at the time, whereas with all previously known devices for automatic batch weighing the time of feeding of the material into the scale-pan invariably depends on the degree of filling of the pan.

In the accompanying drawings:

Fig. 4 shows the bulk supply and measuring means and the electric control device associated therewith.

Figs. 5 to 7 are detailed views of different working positions of the electric control device.

Figure 1:
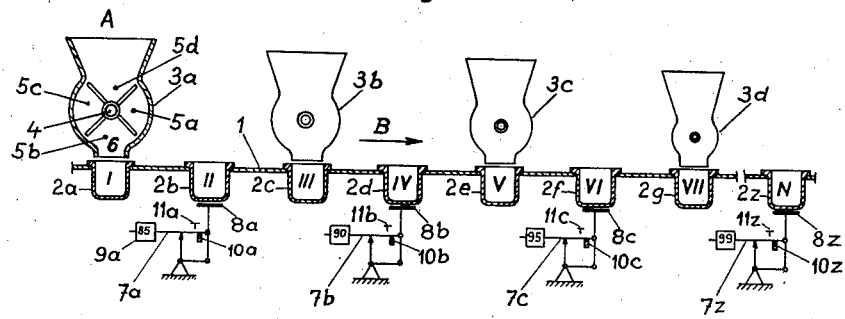
Fig. 1 shows schematically and apparatus according to the present invention.

In Fig. 1, scale pans 2a, 2b, 2c and so on are inserted in openings in the conveyor 1. Bags, boxes or other suitable containers in which the material is packed may be used in place of scale-pans. The conveyor 1 moves mechanically and periodically, conveying the scale-pans 2a, 2b, 2c and so on from the position I into the positions II, III and so on. Thus each scale-pan is transferred from one position to another and remains in each position for an accurately determined time. If, for instance, 0.5 second is allowed for the transfer of the scale-pan from position to position, and similarly 0.5 second for the time that the same is stationary, the working cycle is completed in one second, that is, the capacity of the device will be sixty weighing-operations per minute.

The conveyor is shown in Fig. 1 in the form of a straight band of finite length; it may however be an endless band or a rotating device like the known devices for various systems of automatic scales, which device turns through a predetermined angle and brings the scale-pans from one position to another.

At position I. above the scale-pan 2a is disposed a measuring device 3a, which comprises for example a hopper A filled with material and a drum which is adapted to rotate automatically a quarter of a revolution about the axis 4 each time the conveyor 1 is stationary. The device may have, for example, chambers 5a, 5b, 5c, 5d, from which it can deliver through the opening 6 a batch of material into each of the scale-pans which are periodically brought to it. Obviously the described device is merely shown as an example, and any desired known kind of device can be employed which is suited to the properties of the material and by which various materials are commonly divided into measured batches. A similar measuring device 3b having a smaller capacity, that is delivering smaller batches, is disposed at position III, and further similar devices are provided at all the odd number positions, their capacities decreasing from position to position. It is immaterial, as regards the invention, if the reversed order is adhered to.

A weighing device is disposed in position II under the scale-pan 2b; this may comprise, for example a beam 7a, one arm of which is provided with a table 8a while the other arm has a counterweight 9a, which is marked with the numeral 85 to show that the beam 7a is in equilibrium when 85 grams of material are in the scale-pan 2b. Under the right-hand arm of the beam 7a is a fixed stop 10a which limits movement of the beam in the clockwise direction. Above this arm, and at a particular distance therefrom, is disposed a contact screw 11a which is adapted to close the electrical circuit of any suitable known electro-magnetic device serving to control the measuring device 3b. As is evident from the diagram, the electrical circuit is closed through the screw 11a only if the beam tilts in the counterclockwise direction, that is, only if the scale-pan contains a charge of material which is lighter than the value of the counterweight.

A similar weighing device is disposed at each remaining position denoted by an even number, these devices having beams 7b, 7c, 7d and so on and differing only in the equilibrium value. Thus, at the position IV the equilibrium of the beam 7b corresponds to a charge of 90 grams of material in the scale-pan; consequently the weight is denoted by 90. The equilibrium at position VI corresponds to a charge of 95 grams of material, and so on. The last beam 7z at position N is in equilibrium when 99 grams of material are in the scale-pan 2z. The described weighing devices may be replaced by any suitable kind of weighing apparatus, if desired by the type operating as a spring balance. Further it may be pointed out that weighing devices for automatic weighing are usually provided with a stop device which releases the beam for weighing at fixed intervals and arrests it during the time when weighing is not taking place. Stop devices of the kind mentioned are recommended in weighing devices according to the invention, but they are not illustrated so as to simplify the drawings. One more measuring device (not shown in the drawings) must be disposed beyond the position N, and beyond this again must be provided one more position in which the scale-pan is emptied either by a known mechanical device or by hand.

An example will be given for the purpose of making the essence of the present weighing apparatus clearer. It is assumed that a material is required to be weighed into batches of 100 grams with an accuracy of plus or minus 1 gram. Fig. 1 represents the condition when the empty scale-pan 2a has reached the position I. The measuring device 3a is automatically set in operation, that is, it rotates for example through a quarter of a revolution and delivers by the chamber 5a through the opening 6 a batch of material into the scale-pan 2a. The weights of the material batches which fill the chambers 5a, 5b, 5c, 5d must not exceed the final weight of the finished batches, that is to say, the chambers of the measuring device 3a must not be of such a size that any batch can exceed in weight the desired final weight of the finished batch, and, as an example, for the present case a final weight of 100 grams is taken. By investigating the structure of the material, it is ascertained that the error can attain, for example, 20% in the wrong direction, that is, on the low side; thus the measuring device 3a may feed into the scale-pan 2a only 80 grams instead of 100 grams of material. As already indicated, in the given case the measuring device should feed 80 grams as the minimum weight of a batch of the material. With the subsequent movement of the conveyor in the direction of the arrow B (Fig. 1), the scale-pan 2a, with the material which it has received from the measuring device 3a comes on to the table 8a of the beam 7a at position II. This scale-pan is denoted by 2b in Fig. 1. As already mentioned, the beam 7a is so adjusted, that after the beam has been released, the contact thereon closes with the screw 11a only if the weight of the material in the scale-pan is less than 85 grams. On the other hand, if in the scale-pan there is a weight of material which exceeds 85 grams, the contact does not close with the beam and the latter remains stationary against the stop 10a. In the given case, however, if a scale pan arrives at position II with a weight of material of 80 grams, the beam 7a contacts with the screw 11a, with the result that the measuring device 3b, which is disposed at position III, is set in operation by the agency of an electro-magnetic device which is not shown in the drawings. The measuring device 3b, and similarly each of the remaining measuring devices, operate in such a way that they feed charges of material into the scale-pans as the pans are brought by the conveyor out of the preceding position denoted by an even number and opposite them. In the present case, therefore, the contacting of the beam 7a at position II will cause automatic delivery by the device 3b at position III, of a further fresh charge of material into the scale-pan in which there are already 80 grams of material.

The greatest weight of the charge which can be delivered by the measuring device 3b is, for example, 15 grams. It will be assumed that the minimum weight may be 30% less, that is, 10.5 grams. If it is further assumed that in the given case the measuring device 3b feeds a charge weighing 11 grams into the scale-pan denoted by 2c at position III, with the subsequent movement of the conveyor 1, the scale-pan 2c arrives at position IV with a total charge of material of 80+11=91 grams. In this position the scale pan, denoted by 2d, is subjected to a further weighing by the beam 7b, which is so adjusted that it makes contact with the screw 11b if the material in the scale-pan weighs less than 90 grams and on the other hand there is no possibility of a contact if the weight exceeds or equals 90 grams.

As previously mentioned, the scale-pan 2d already contains 91 grams of material; consequently the beam 7b remains stationary against the stop 10b, so that contact does not take place between the beam 7b and the contact screw 11b. A further movement of the conveyor 1 brings the scale-pan to the measuring device 3c at position V, where, however, a fresh charge is not added to the scale-pan 2c because the apparatus 3c has not received an impulse setting it in operation, owing to the previous position of the beam 7b. A further movement of the conveyor 1 advances the scale-pan to position VI. At this position is situated the beam 7c which makes contact with the screw 11c if the weight is less than 95 grams; thus as the weight of material is 91 grams, the beam is caused to contact with the screw 11c and sets the next measuring device 3d in operation, which is situated at position VII. It will be assumed that the measuring device 3d supplies charges having a maximum weight of 6 grams and a minimum weight of 30% less, i. e., 4.2 grams. In the given case, the charge supplied by this device will be taken as amounting to 5 grams, so that the content of the scale-pan 2g totals 80+11+5, that is, it contains 96 grams of material. In a similar manner the scale-pan is advanced from weighing device to measuring device until it arrives at the last beam at position N. Assume that a scale-pan arrives at position N with a material content of 98 grams. As is evident from Fig. 1, the beam 7z remains against the stop 10z when the weight of material exceeds 99 grams and it closes the contact when the weight is less than 99 grams, so that the scale-pan 2z which holds 98 grams of material operates the contact and in consequence sets in operation a final measuring device (not shown in the drawings) which delivers charges having a maximum weight of 2 grams and a minimum weight of 50% less, i. e., 1 gram. If the last measuring device delivers a minimum of 1 gram, the scale-pan will contain 99 grams of material, and if the maximum charge is delivered, i. e., 2 grams, the content of the scale-pan will equal 100 grams; consequently a final weight of the material batch is attained which comes within the prescribed limits of plus or minus 1 gram.

If it should happen that the first measuring device 3a delivers a heavier batch of material, perhaps even the maximum, i. e., 100 grams, instead of 80 grams, it is quite clear that further weighing devices and further measuring devices, or none as the case may be, can be set in operation, so that in every case the final weight of the material batch is within the prescribed limits. In the example described the division was carried out with a prescribed error of plus or minus 1 gram, and the addition of an extra beam and a measuring device would suffice to raise the degree of accuracy with the same number of weighing operations per unit time.

It is apparent from the foregoing that the present apparatus effects a combination of a mechanical measuring and an automatic weighing, and that the lack of uniformity in the structure of the material affects merely the weight of the individual charges, while both the accuracy of the final weighing and the output are independent of the structure of the material. The apparatus according to Fig. 1 is characterised by the arrangement of the measuring and weighing devices in alternate sequence in separate positions. The described arrangement makes it possible to utilise 100% of the time during which the conveyor is stationary both for feeding the charges through the measuring devices and also for the check weighing, the delivery of the material and the weighing taking place simultaneously at different places.

Figure 2:
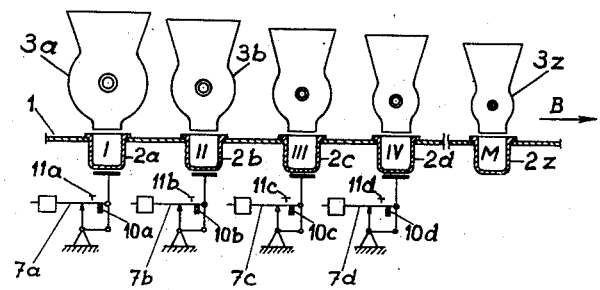
Figs. 2 and 3 show alternative modifications of the apparatus according to the invention.

Fig. 2 shows another arrangement of a batch weighing apparatus according to the invention. In this embodiment, the weighing devices and the measuring devices are disposed at one and the same place. The operation of a batch weighing apparatus according to Fig. 2 is the following. The measuring device 3a that is disposed in position I feeds automatically into the scale-pan 2a the corresponding charge of material, which is thereafter subjected to a weighing operation on the beam 7a which is disposed at the same position I. The beam can make contact with the screw 11a, depending on the amount by which the material in the scale-pan 2a falls short of the required final weight, and thus set in operation the measuring device 3b which is situated at the next position II and which delivers its charge into the scale-pan after the latter has attained position II. Thereafter, the control weighing of the material by the beam 7b takes place in the same position II, this beam controlling the action of the measuring device in the following position III, and so on. Finally the scale-pan reaches the last position M, at which is disposed a measuring device 3z which supplies the last charge of material to the scale-pan 2z.

According to the second alternative, except at the last position, first the measuring device operates and then follows the weighing operation at the same position in succession, which controls the operation of the next measuring device situated at the following position.

Obviously the apparatus according to Fig. 2 can be modified by providing merely a measuring device in position I, without a weighing device, and in this case the last position will be provided with both arrangements, that is, with both a weighing device and also with a measuring device. In this case the operation of batch weighing consists in the following. The measuring device in position I delivers a batch of material into the scale-pan which is then transferred to position II (Fig. 2), where it is at first weighed on the weighing device that controls the operation of the measuring device 3b which is placed at the same position II. After the delivery of the charge of material by this measuring device, the scale-pan is transferred to position III and to the second weighing device which actuates the third measuring device which is disposed also at position III, and so forth, until the scale-pan reaches the last position where, after the last weighing, it receives the last charge of material from the measuring device that is situated at that position.

Figure 3:
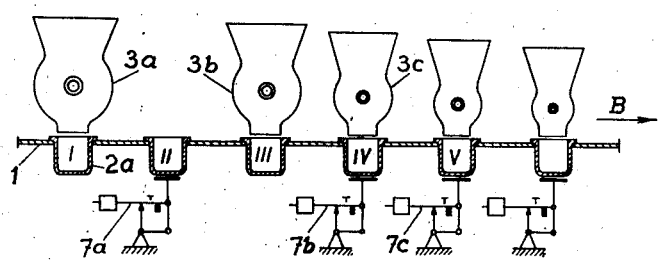

It will be desirable to use the apparatus according to Fig. 1 in the batch weighing of material that does not flow easily, because the whole period during which the conveyor 1 is stationary can be used for the transfer of material from the measuring device to the scale-pan, that is nearly twice the time allowed by the arrangement according to Fig. 2. The arrangement according to Fig. 2 can be employed for a material which flows readily, but in batch weighing a material in relatively large batches it is preferable to use the arrangement according to Fig. 3 which is a combination of the two arrangements hereinbefore described with reference to Figs. 1 and 2. The arrangement according to Fig. 3 differs from the above-described in that one or several of the first measuring devices, for instance 3a and 3b, supply relatively large charges of material and are placed at independent positions so that a longer time is available for delivering relatively large quantities of material, namely, the whole period while the conveyor 1 is stationary. Certain of the first weighing devices correspondingly are given independent positions, for example the beam 7a at position II. In the remaining positions, where the measuring devices deliver relatively small charges and little time is required for the transfer of the material from the measuring device to the scale-pan, the measuring device and the weighing device are disposed at one and the same position, as is the case in the arrangement according to Fig. 2.

The measuring device 3a at position I delivers a batch of material into the scale-pan 2a; this batch is thereupon transferred to the beam 7a at position II, and, after the control operation on the same, it advances to the measuring device 3b at position III, whence it is conveyed to the beam 7b at position IV. This beam controls the operation of the measuring device 3c which is placed at the same position IV. After a charge has been delivered by this device into the scale-pan, the latter advances to a further position V, where first control weighing takes place and then the measuring device operates, which is disposed at the same position, and so forth. This is repeated until the scale-pan arrives at the last position, that is, to the last weighing device and to the last measuring device, which are placed at a common position.

With respect to Figs. 4 to 7 it will be noted that in Figure 4 the beam 7a, and the devices 8a, 9a, 10a, and 11a, correspond to those shown in Figure 1 of the drawings. It is the function of this beam to control the action of the measuring device 3b, so that the latter feeds a predetermined volume of material only when the weight of the material in position II of Figure 4 is smaller than the counterweight. If the weight of the material is equal to the counterweight, or if it has a greater weight than the counterweight, then the measuring device 3b is not intended to feed any further material into the pan.

Figures 4, 5, 6, and 7 illustrate one way in which this control can be effected. A motor, not shown, drives the wheel 13 by means of chain or belt. Through the intermediary of a crank pin 14 and a connecting rod 15, a lever 16 is set into oscillatory motion. The lever 16 rotates freely around the shaft 17, and at its end a pawl 18 is mounted and is under the constant urgence of a spring 19. The pawl 18 oscillates with the lever 16, and during a counterclockwise motion the pawl partakes of an idle motion, but at the end of its movement it tries to engage the tooth of the ratchet wheel 20. This engagement is prevented, however, by the lever 21 arranged behind the tooth of the ratchet wheel. As a result, a clockwise movement of the pawl 18 does not effect a corresponding movement of the ratchet wheel 20 and the pawl, therefore, returns to the original position shown in Figure 4. This is the way in which the pawl 18 operates when there is enough material in the scale pan 2b in position II.

Provision is made for a synchronization between the motion of the conveyor 1 and the action of the pawl 18. While the conveyor is in motion, i. e., while the pans are advanced from position to position, the pawl 18 is caused to partake of an idle motion. Synchronization is such that the pawl partakes of its working motion only when the conveyor is stationary.

Assuming that the conveyor has come to rest, and the beam 7a released (by a means not shown), then, depending upon the weight of material in the pan 2b, the beam either remains at rest against the stop 10a or closes a contact with the contact screw 11a. If such a contact is established, an electric circuit through the solenoid 22 is completed and the latter lifts the core 23 and the draw bar 24, thereby swinging the lever 21 into the full-line position of Figure 6. In this position, the lever is engaged by the pawl 25. Under this condition, the pawl 18 will engage with the tooth of the ratchet wheel 20 without hindrance, as shown in Figure 7. During this engagement, the front end of the pawl 18 frees the engagement of the lever 21 with the pawl 25; and as soon as the pawl 18 has started on its clockwise working movement, the lever 21 falls immediately upon the ratchet wheel 20 and resumes the position of Figure 4 at the completion of the working movement.

Whenever the pawl 18 engages with the ratchet wheel 20, the shaft 17 is turned, and this turns the drum of the measuring device that is carried by it, with the result that the feeding drum feeds a fixed volume of material into the pan beneath it.

Figures 4–7 are illustrative of a mechanism for carrying out the steps diagrammed in Figure 1 of the original drawing. To carry out the procedure of Figures 2 and 3, a similar device or mechanism may be provided, altered only as to the timing of the working movement of the pawl 18.

I claim:

1. An apparatus for automatically weighing loose materials into equal weight quantities, comprising a series of equally spaced containers adapted to be displaced along a predetermined path, a series of stop stations arranged along said path apart from the containers and spaced from one another a distance equal to that between the equally spaced containers, means for stepwise displacing said container series along said path over distances equal to the space between the equally spaced containers, a bulk supply of the material to be weighed, a series of delivery devices for mechanically measuring from said bulk supply decreasing partial volume quantities of variable weights and for delivering said partial quantities into said containers, each of said delivery devices being stationarily disposed at one of said stop stations, a series of weighing mechanisms for testing the increasing total weight of the material in each of said containers after each step thereof past a delivery device, each of said weighing mechanisms being stationarily disposed at one of said stop stations, and stationary control means associated with each one of said weighing mechanisms to control one of said measuring and delivery devices respectively, at least one of said control means being adapted to be actuated by a weighing mechanism at one of said stop stations to control a measuring and delivery device disposed at the next following stop station.

2. An apparatus as claimed in claim 1, in which said weighing mechanisms and measuring and delivery devices are arranged alternately at the successive stop stations, and each of said control means is adapted to be actuated by a weighing mechanism at one stop station to control a delivery device at the next following stop station.

3. An apparatus as claimed in claim 1, in which one of said weighing mechanisms and one of said measuring and delivery devices are arranged alternately at successive stop stations, while another weighing mechanism and delivery device are disposed at one and the same stop station.

VLADIMIR DMITRIJEVIC POPOV.